C. Wilson,
Dressing Stone.

Nº 5,012.  Patented Mar. 13, 1847.

UNITED STATES PATENT OFFICE.

CHARLES WILSON, OF SPRINGFIELD, MASSACHUSETTS.

CUTTING STONE.

Specification of Letters Patent No. 5,012, dated March 13, 1847.

*To all whom it may concern:*

Be it known that I, CHARLES WILSON, of Springfield, county of Hampden, State of Massachusetts, have invented a new and Improved Plan for Turning, Cutting, and Splitting Stone and other Like Material; and I do hereby declare that the following is a full and exact description of the same.

Figure 1:
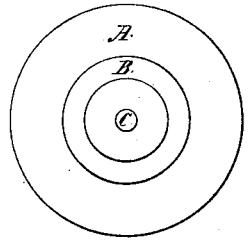
Figure 1:
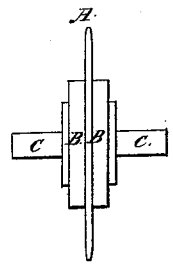

My cutting tool is represented by Figure 1 on the drawing which is hereunto annexed and it consists of a circular knife or cutter of steel A which may be either in one piece or consisting of segments and there may be one, two or more such cutters upon the same shaft or axis, and the cutter or cutters may be secured to the shaft by means of plates B B. The cutter revolves upon its axis C C, which is supported upon convenient bearings so that the tool may be adapted for use in a slide-rest, slide-lathe, planing machine, &c.

The manner of using the instrument may be understood from the following description of the process of turning off the face of a grindstone which consists simply in attaching the cutter to a slide rest of convenient form and causing it to traverse across the face of the stone at the same time that it is pressed against the stone with sufficient force, thus communicating to the cutter the rotary motion of the stone. This produces a true and even surface which may be either straight or curved. The circumference of the cutter may be either smooth like a knife or notched after the manner of circular saw according to the nature of the work required. Plane surfaces may be produced either by causing the stone to traverse while the cutter merely turns upon its axis or by causing the cutter to traverse on the stone, the friction at the edge in either case giving to the cutter its rotary motion.

Figure 2:
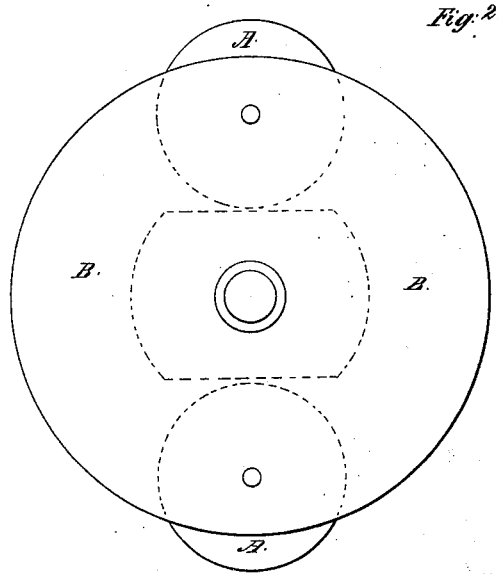
Figure 2:
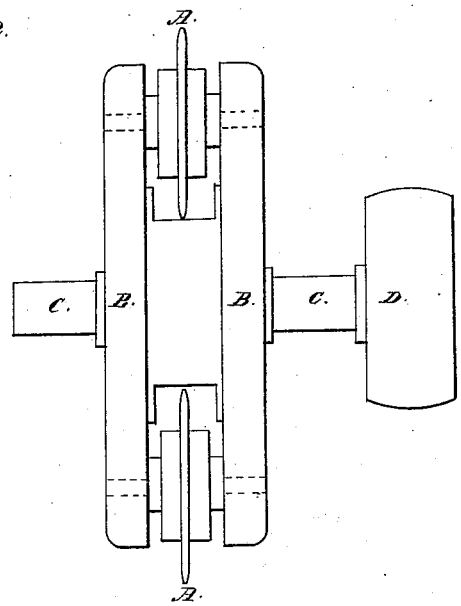

Fig. 2 exhibits the same instrument A A mounted upon a revolving frame B B which is intended to hold one, two or more cutters and which frame is driven upon its bearings or axis C C by the pulley D. My intention is to apply it to the cutting of regular and irregular figures by adapting it to any of the modes in use for producing irregular figures such as gun-stocks, shoe-lasts, &c., in addition to other modes of application.

What I claim as my invention and desire to secure by Letters Patent is—

The mode of cutting, turning or splitting stone or other like material by means of a revolving cutter operating in the manner herein set forth.

CHARLES WILSON.

In presence of—
   B. P. McNEIL,
   D. H. DUSTIN.